(12) United States Patent
Bryant

(10) Patent No.: US 9,696,817 B2
(45) Date of Patent: Jul. 4, 2017

(54) PORTABLE ELECTRONIC DEVICE INCLUDING KEYBOARD AND METHOD OF CONTROLLING THE SAME

(71) Applicant: BLACKBERRY LIMITED, Waterloo (CA)

(72) Inventor: Cody Bryant, Waterloo (CA)

(73) Assignee: BlackBerry Limited, Waterloo (CA)

( * ) Notice: Subject to any disclaimer, the term of this patent is extended or adjusted under 35 U.S.C. 154(b) by 20 days.

(21) Appl. No.: 14/795,794

(22) Filed: Jul. 9, 2015

(65) Prior Publication Data

US 2017/0010680 A1    Jan. 12, 2017

(51) Int. Cl.

| | |
|---|---|
| *G06F 3/02* | (2006.01) |
| *G06F 3/041* | (2006.01) |
| *G06F 3/0488* | (2013.01) |
| *G06F 1/16* | (2006.01) |
| *G06F 3/023* | (2006.01) |

(52) U.S. Cl.
CPC .............. *G06F 3/021* (2013.01); *G06F 1/169* (2013.01); *G06F 1/1662* (2013.01); *G06F 3/0233* (2013.01); *G06F 3/041* (2013.01); *G06F 3/04883* (2013.01)

(58) Field of Classification Search
CPC ... G06F 3/0488; G06F 3/04883; G06F 17/243
See application file for complete search history.

(56) References Cited

U.S. PATENT DOCUMENTS

| | | | |
|---|---|---|---|
| 8,537,132 B2 | 9/2013 | Ng et al. | |
| 2005/0105781 A1* | 5/2005 | Sakamoto | G06K 9/00154 382/119 |
| 2005/0136984 A1* | 6/2005 | Nakatsuchi | H04M 1/72525 455/566 |
| 2006/0136731 A1* | 6/2006 | Hicks | G06F 21/32 713/176 |

(Continued)

FOREIGN PATENT DOCUMENTS

EP     2778858 A1    9/2014

OTHER PUBLICATIONS

Extended European Search Report for European Application No. EP161731542, mailed on Nov. 11, 2016, 8 Pages.

*Primary Examiner* — Benjamin C Lee
*Assistant Examiner* — Dong Hui Liang
(74) *Attorney, Agent, or Firm* — Borden Ladner Gervais LLP; Geoffrey deKleine

(57) ABSTRACT

A portable electronic device includes a touch-sensitive display including a display and display touch-sensors to detect touches, and a keyboard including mechanical keys associated with characters, the mechanical keys including depressible keycaps to output the characters and keyboard touch sensors to detect touches on the mechanical keys. A processor is coupled to the keyboard and to the touch-sensitive display to detect a touch at a location associated with a signature entry field displayed on the touch-sensitive display, in response to detecting the touch, enter a keyboard signature process, detect a moving touch on the mechanical (Continued)

keys of the keyboard, along a path of contact of the touch on the mechanical keys, and, in response to detecting completion of the moving touch, enter a signature defined by the path of contact of the touch on the mechanical keys into the signature entry field.

12 Claims, 5 Drawing Sheets

(56) References Cited

U.S. PATENT DOCUMENTS

| | | | | |
|---|---|---|---|---|
| 2006/0181511 A1* | 8/2006 | Woolley | ................ | G06F 3/0213 |
| | | | | 345/160 |
| 2007/0173240 A1 | 7/2007 | Lim | | |
| 2010/0148995 A1* | 6/2010 | Elias | ..................... | G06F 3/0488 |
| | | | | 341/22 |
| 2010/0309030 A1* | 12/2010 | Huang | ................. | H01H 13/702 |
| | | | | 341/33 |
| 2011/0060985 A1* | 3/2011 | Kerr | .................... | G06F 3/04812 |
| | | | | 715/702 |
| 2011/0205161 A1* | 8/2011 | Myers | ..................... | G06F 3/016 |
| | | | | 345/169 |
| 2013/0328886 A1 | 12/2013 | Clark | | |
| 2015/0195092 A1* | 7/2015 | Bartkiewicz | .......... | H04L 9/3247 |
| | | | | 713/176 |

* cited by examiner

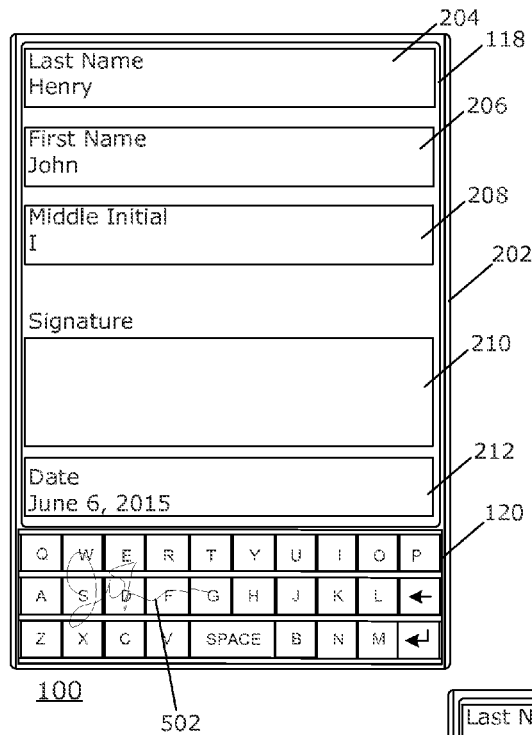

PORTABLE ELECTRONIC DEVICE INCLUDING KEYBOARD AND METHOD OF CONTROLLING THE SAME

FIELD OF TECHNOLOGY

The present disclosure relates to portable electronic devices including touch-sensitive displays.

BACKGROUND

Portable electronic devices have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs, or tablet computers are generally intended for handheld use and ease of portability. A touch-sensitive input device, such as a touch-screen display, is particularly useful on handheld devices, which are small and may have limited space for user input and output.

Improvements in electronic devices with touch-sensitive displays are desirable.

BRIEF DESCRIPTION OF THE DRAWINGS

Embodiments of the present disclosure will now be described, by way of example only, with reference to the attached figures, in which:

FIG. 5, FIG. 6, and FIG. 7 illustrate examples of controlling the electronic device in accordance with the flowchart of FIG. 4.

DETAILED DESCRIPTION

Figure 1:
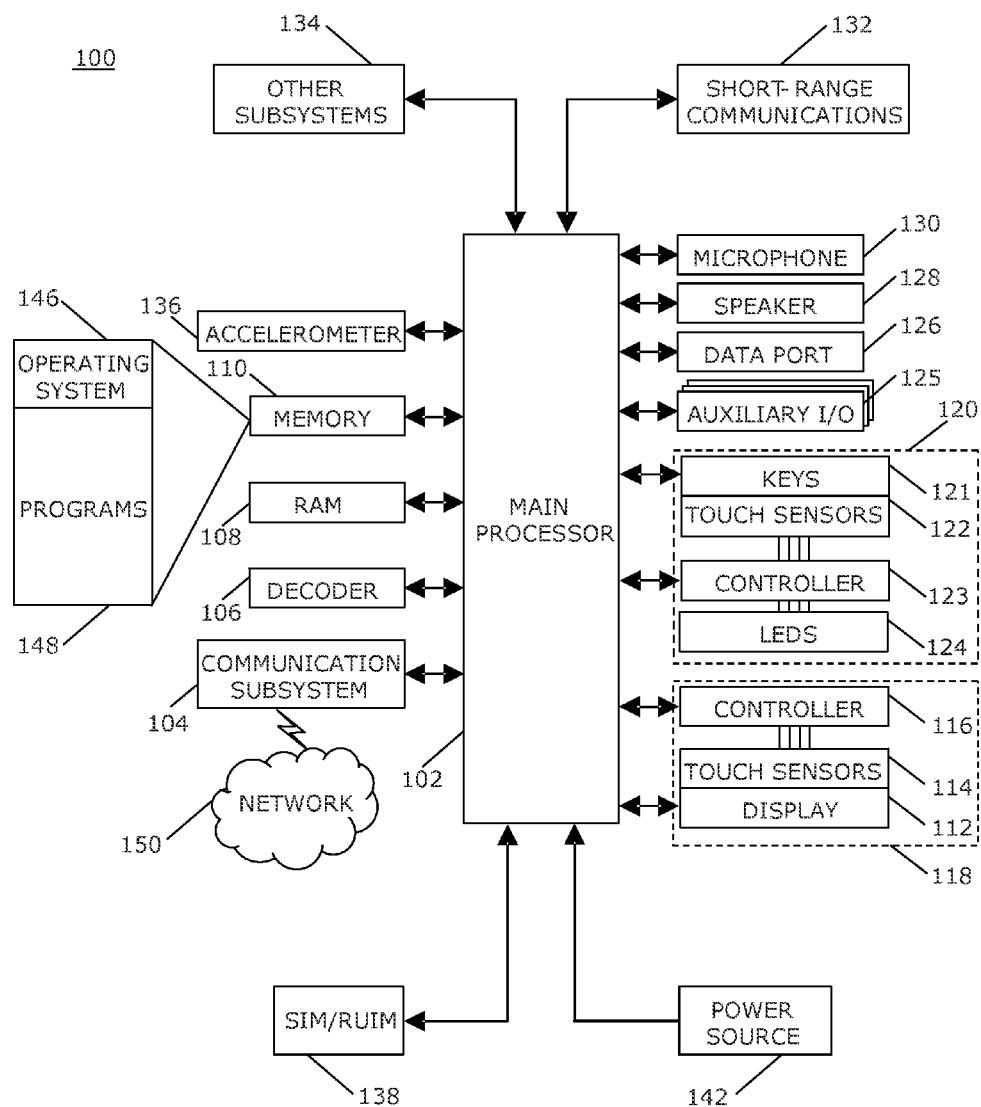
FIG. 1 is a block diagram of a portable electronic device in accordance with the present disclosure.

The following describes a portable electronic device, a method of controlling the portable electronic device, and a keyboard for use with an electronic device. The keyboard includes a plurality of mechanical keys associated with a plurality of characters, the keys including depressible keycaps to output respective characters of the plurality of characters to the portable electronic device, and a plurality of keyboard touch sensors arranged and constructed to detect touches on the mechanical keys. The keyboard also includes a controller coupled to the keyboard touch sensors and operable to, in response to entry into a keyboard signature process, detect a moving touch on the keys of the keyboard, along a path of contact of the touch on the keys of the keyboard, and, in response to detecting completion of the moving touch, output data identifying the path of contact of the touch as a signature to the portable electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a keyboard or a portable electronic device including a keyboard, as described herein. Examples of portable electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 125, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102.

The physical keyboard 120 includes a plurality of mechanical keys 121 that include mechanical switches or contacts for input to the electronic device 100 when a mechanical key 121 of the keyboard 120 is depressed by a sufficient amount to oppose a bias of the mechanical key 121. The mechanical keys are associated with a plurality of characters such that a respective character is output from the keyboard to the processor 102 in response to depression a keycap of a key.

In this example, keyboard touch sensors 122 are disposed on the keyboard and the keyboard touch sensors 122 are coupled to a controller 123. Thus, in addition to depression of the mechanical keys 121 of the keyboard 120 for input to the portable electronic device 100, touches on the mechanical keys 121 are also detected for input to the processor 102.

The physical keyboard 120 may include a light source, such as light emitting diodes (LEDs) 124 disposed under the mechanical keys 121 to selectively illuminate at least parts of the mechanical keys 121. At least parts of the mechanical keys 121 may be translucent such that at least parts of the mechanical keys 121 are selectively illuminable utilizing the LEDs 124. The LEDs 124 may be coupled to the controller 123 to control the selective illumination of the parts of the mechanical keys 121. In the example shown in FIG. 1, the mechanical keys 121 are coupled to the main processor 102. Alternatively, the mechanical keys 121 may be coupled to the main processor 102 via the controller 123.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 125, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 125. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch on a touch-sensitive display 118 may be a touch of a duration of contact that is compared to a threshold period of time and that ends within the threshold period of time. Thus, for a tap, the touch contact with the touch-sensitive display 118 is relatively short because the time between the start of touch contact and the end of touch contact is less than the threshold period of time.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The keyboard touch sensors 122 may be any suitable touch sensors, such as capacitive touch-sensors and may comprise any suitable material, such as indium tin oxide (ITO) or any other suitable material. Optionally, the keyboard touch sensors 122 may be coupled to the same controller 116 as the touch sensors of touch-sensitive display 118 such that a single controller is utilized rather than two controllers 116, 123. The keyboard touch sensors 122 may include drive electrodes and sense electrodes disposed on each mechanical key 121 or under keycaps of the mechanical keys 121, for example.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

By repeatedly scanning the keyboard touch sensors 122, movement of a touch along the keyboard may also be detected. Thus, one or more gestures may be detected by the keyboard touch sensors 122. A gesture on the mechanical keys 121 of the keyboard 120 may be identified by attributes of the gesture, including the origin point, the end point, the distance travelled, the duration, the velocity, and the direction, for example.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
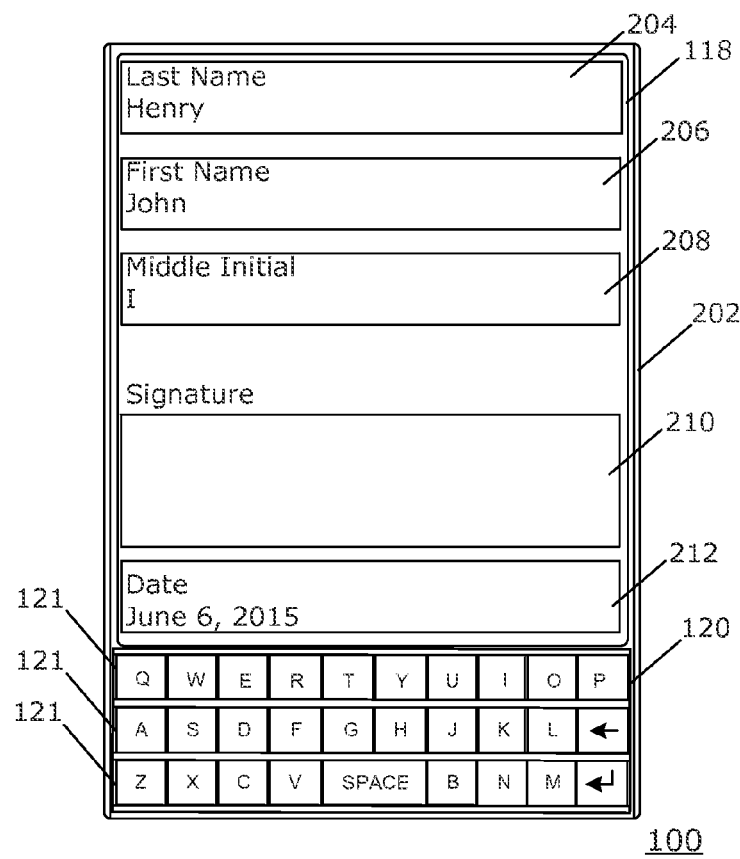
FIG. 2 is a front view of an example of a portable electronic device in accordance with the disclosure.

A front view of an example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1.

The mechanical keyboard 120 is disposed adjacent to and below the touch-sensitive display 118 in the orientation illustrated in FIG. 2. The mechanical keyboard 120 includes the plurality of mechanical keys 121. Each one of the mechanical keys 121 of the keyboard 120 is associated with a respective character such that an associated character is entered utilizing a mechanical key 121. In the example shown in FIG. 2, each key is associated with a character of the alphabet, a space, or a return function. Although the keyboard shown in FIG. 2 is a QWERTY keyboard, other keyboard layouts may be successfully implemented, such as an AZERTY keyboard, a QWERTZ keyboard, or any other suitable keyboard. In the present example, the keyboard 120 includes only three rows of mechanical keys 121. The three row keyboard does not include a shift key, punctuation, or keys for numerical character entry. In the present example, the shift key, punctuation, and keys for numerical character entry may be provided via virtual keys displayed on the touch-sensitive display 118 and selectable by a touch at a location on the touch-sensitive display 118 at which the virtual key is displayed. According to another example, a four row keyboard may be utilized.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth.

In the example illustrated in FIG. 2, an electronic document 204 is displayed. The electronic document 204 includes fields for completion. The fields include, for example, a Last Name field 206, a First Name field 208, a Middle Initial field 210, a Signature field 212, and a Date field 214. Each of the Last Name field 206, First Name field 208, Middle Initial field 210, and Date field 214 may be completed by, for example, entry of characters by typing utilizing the mechanical keys 121 of the keyboard 120. The signature field 212, however, is utilized for receiving a signature and characters are not typed in the Signature field 212.

Other fields may be included and fewer or more fields may be utilized. The electronic document 204 may be in any suitable format. The electronic document may be a document stored on the electronic device 100, stored remotely, or available on a website or webpage, for example.

Figure 3:
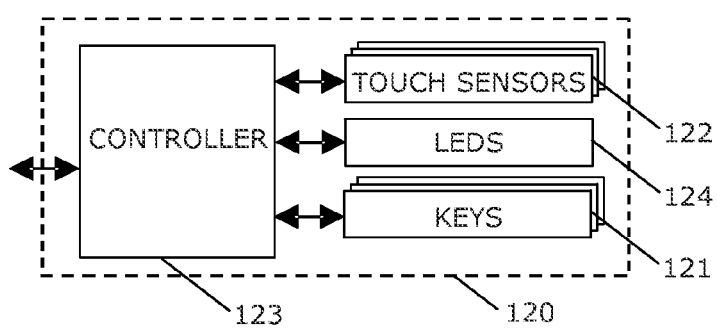
FIG. 3 is a block diagram of an example of a keyboard in accordance with the present disclosure.

A block diagram of another example of the keyboard 120 is shown in FIG. 3. In this example, the keyboard 120 includes the keyboard controller 123 that is coupled to and in communication with the processor 102 that controls the overall operation of the electronic device 100. The controller 123 may include software executed by the controller 123 and stored in a local, persistent, updatable store.

The controller 123 interacts with other components, including the keyboard touch sensors 122 that are utilized to detect touches on the keyboard 120 and the LEDs 124 that are selectively illuminable to selectively illuminate portions of keycaps of the mechanical keys 121 of the keyboard 120. In this example, the controller 302 is also coupled to the mechanical keys 121 such that output from the keyboard 120 in response to depression of keycaps of the mechanical keys 121 is provided via the controller 123.

One or more touches, also known as touch contacts or touch events, may be detected by the keyboard touch sensors 122. The controller 302 may determine attributes of the touch, including a location of the touch. By repeatedly scanning the keyboard touch sensors 122 to detect touches, movement of a touch relative to the keyboard 120 may be detected. One or more gestures may also be detected by the keyboard 120.

Figure 4:
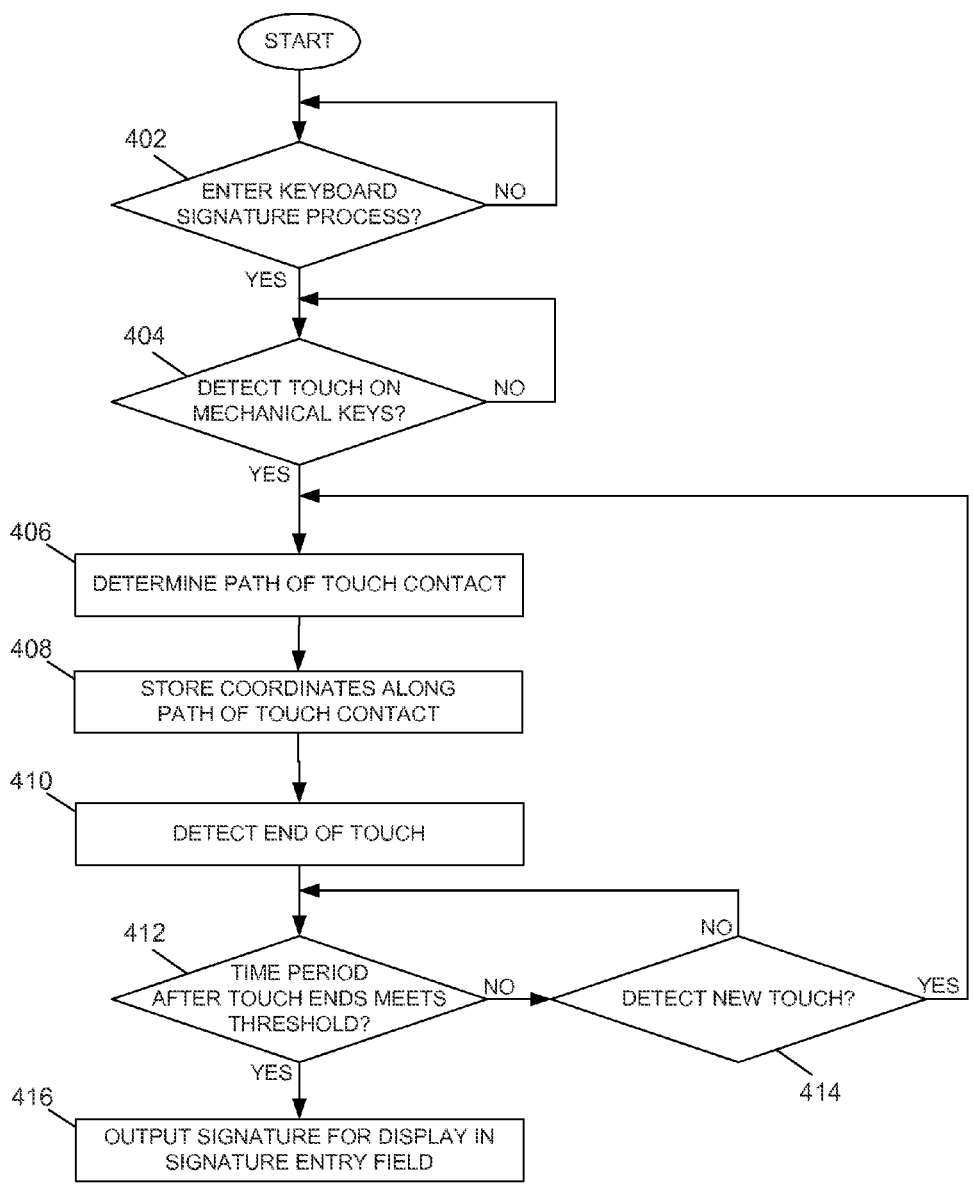
FIG. 4 is a flowchart illustrating a method of controlling an electronic device in accordance with the present disclosure.

A flowchart illustrating a method of controlling an electronic device, such as the portable electronic device 100, is shown in FIG. 4. The method may be carried out by software executed, for example, by the keyboard controller 123, the processor 102 or a combination thereof. Coding of software for carrying out such a method is within the scope of a person of ordinary skill in the art given the present description. The method may contain additional or fewer processes than shown and/or described, and may be performed in a different order. Computer-readable code executable by at least one controller 123 or processor 102 of the portable electronic device 100 to perform the method may be stored in a computer-readable storage medium, such as a non-transitory computer-readable medium.

A determination is made whether a keyboard signature process is entered. In response to entry into the keyboard signature process at 402, the method continues at 404. The keyboard signature process may be entered when a touch is detected by the touch-sensitive display 118, at a location at which a signature field is displayed on the touch-sensitive display 118. For example, a tap at a location at which a signature field is displayed on the touch-sensitive display is determined to be an input to enter the keyboard signature process. Alternatively, entry into the keyboard signature process may be automatically entered, for example, in response to movement of a cursor to a keyboard signature field or in response to opening or accessing a document, webpage, program, and so forth. The keyboard signature field may be a field in a document, on a webpage, a message signature field such as an email message signature field, or any other suitable field.

When a touch is detected on the mechanical keys 121 of the keyboard 120 at 404, the process continues at 406. The path of the touch contact is determined at 406. The path of touch contact is determined by identifying locations of contact along the path of the moving touch. For example, x and y components of a location of the touch are repeatedly determined as the touch continues along the mechanical keys 121 of the keyboard 120. The locations that are repeatedly determined, together define a path along which touch contact is made with the keyboard 120.

The locations that are repeatedly determined are temporarily stored in memory at 408, for example, in the keyboard controller 123 to maintain data defining identifying a path of the touch.

The end of the touch contact is detected at 410. The keyboard touch sensors 122 are continually utilized to detect touches on the keycaps of the mechanical keys 121 in scans of the keyboard touch sensors 122. The keyboard touch sensors 122 are utilized to identify when a touch ends by identifying that a touch that is detected in one scan of the keyboard touch sensors 122 is not detected in a subsequent scan of the keyboard touch sensors 122.

A period of time after which the touch has ended is tracked by starting timing when the end of the touch contact is detected. The period of time is compared to a threshold period of time at 412. In response to determining that the period of time does not meet the threshold period of time at 412, the process continues at 414. In response to detecting a new touch at 414, the process continues at 406. Thus, when a new touch is detected at 414, prior to the expiry of the threshold period time after which the original touch ended, the new locations of the new touch are repeatedly determined and temporarily stored in memory in the keyboard controller 123 in addition to the previously stored locations of the previous touch to maintain data identifying the paths of the touches.

When the threshold period of time is met at 412 without detection of a new touch, the process continues at 416. The data identifying the path or paths of the touch contact with the keyboard 120 is output to the processor 102 and is added to the signature field by displaying a representation of the path in the Signature field on the touch-sensitive display 118. The touch data, including the coordinate locations are translated to locations within the Signature field 210 such that the distance between coordinate locations and relative location of coordinate locations are maintained. The coordinate locations are joined by line segments to provide the completed signature, which is displayed in the Signature entry field 210 on the touch-sensitive display 118.

Optionally, the signature may be scaled or truncated to fit in the Signature entry field 210 in the case in which the signature exceeds the space allocated in the Signature entry field.

Thus, the touch is complete when touch contact of a moving touch on the mechanical keys 121 ends and no further touch contact is detected on the keyboard for the threshold period of time. Alternatively or additionally, the keyboard signature process may end, for example, in response to detecting a further touch on the touch-sensitive display 118, at a location that is not associated with the Signature field. For example, the keyboard signature process may end in response to detecting a touch at a location on the touch-sensitive display 118 at which the signature field is not displayed.

Figure 7:
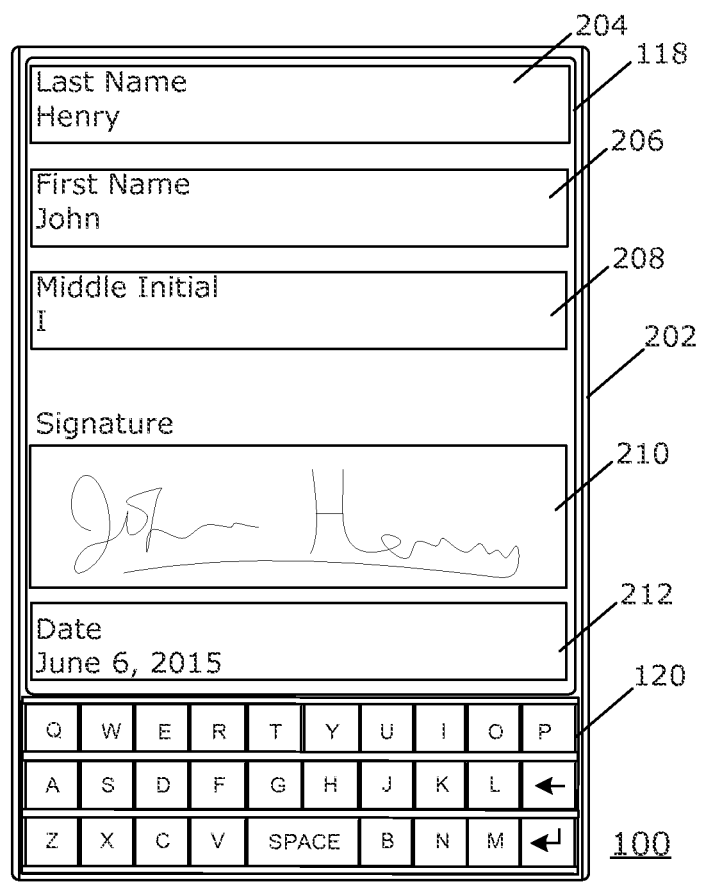

Reference is again made to FIG. 4 as well as FIG. 5 through FIG. 7 to describe an example of the method of FIG. 4. In this example, a signature is entered into the Signature field 210 displayed on the touch-sensitive display 118.

In response to detecting a tap on the touch-sensitive display 118, at a location at which the Signature field 210 is displayed, the portable electronic device 100 enters the keyboard signature process. In response to entry into the keyboard signature process at 402, the method continues at 404. A touch is detected on the mechanical keys 121 of the keyboard 120 at 404 and the process continues at 406. The touch detected at 404 is a moving touch 502 on the keyboard 120 as a signature is provided on the keyboard 120. The path of touch contact is determined at 406 by identifying coordinate locations of contact with the mechanical keys 121 of the keyboard 120, along the path of the moving touch 502. The coordinate locations are temporarily stored in memory at 408. An end of the moving touch 502 is detected at 410. In this example, only a portion of the signature is provided on the keyboard 120, as shown in FIG. 5 and thus, the signature is not complete. A new touch is detected at 414 prior to the period of time, after which the touch ended at 410, meeting the threshold period of time at 412.

The path of the contact of the new touch 602 is determined at 406 and the coordinate locations are temporarily stored in memory at 408 in addition to the coordinate locations stored in memory for the touch detected at 404. An end of the new touch 602 is detected at 410. In this example, the remaining portion of the signature is provided on the keyboard 120, as shown in FIG. 6 and the time period after which the new touch ends meets the threshold period of time at 412, without any further touch on the keyboard 120.

The path of touch contact of the touches 502, 602 is shown on the keyboard 120 in FIG. 5 and FIG. 6 for the purpose of the present explanation. The path of the touch contact is not displayed as illustrated in FIG. 5 and FIG. 6, however. Optionally, the path of the touch contact may be displayed by selectively illuminating the LEDs 124 disposed under the keycaps of the mechanical keys 121 along the path of the touch contact. Selective illumination of parts of keycaps provides confirmation of detection of the touch contact along a path of the touch contact. Alternatively, the keys contacted along the path of touch contact may be selectively illuminated. Thus, feedback is provided that the touch is detected and signature received as the touch contact continues.

The touch data, including the coordinate locations, is utilized to enter the signature in the Signature field 210. To enter the signature in the Signature field 210, the coordinate locations are translated to locations within the Signature field 210 such that the distance between coordinate locations and relative location of coordinate locations are maintained. The coordinate locations are joined by line segments to provide the completed signature, which is displayed in the Signature entry field 210 on the touch-sensitive display 118, as illustrated in FIG. 7.

In the flowchart of FIG. 4 and the example described with reference to FIG. 5 through FIG. 7, the entire signature is received on the touch-sensitive display 118 before entry into the Signature field 210. Alternatively, the coordinate locations may be translated and the signature displayed in the Signature entry field 210 as the touch continues.

The method described above facilitates the addition of a signature to a document, webpage, or message, for example, without requiring printing, signing, or scanning of the document, webpage, or message. The use of a touch-sensitive display for selection of a signature field and the use of the capacitive keyboard for signing utilizing a finger or stylus, for example, is advantageous in that selection of entry into a signature process is provided and the signature is added utilizing separate devices, without requiring additional peripheral or input devices for entry or for signature.

The scope of the claims should not be limited by the preferred embodiments set forth in the examples, but should be given the broadest interpretation consistent with the description as a whole.

What is claimed is:

1. A portable electronic device comprising:
   a touch-sensitive display comprising a display and a plurality of display touch-sensors arranged and constructed to detect touches on the touch-sensitive display;
   a keyboard comprising:
      a plurality of mechanical keys associated with a plurality of characters, the mechanical keys including depressible keycaps to output respective characters of the plurality of characters;
      a plurality of keyboard touch sensors additionally arranged and constructed to detect touches on the mechanical keys;
   a processor coupled to the keyboard and to the touch-sensitive display and operable to:
      detect a touch at a location at which a signature entry field displayed on the touch-sensitive display;
      in response to detecting the touch at the location at which the signature entry field is displayed, enter a keyboard signature process;
      detect a moving touch on the mechanical keys of the keyboard, along a path of contact of the touch on the mechanical keys of the keyboard when in the keyboard signature process; and
      in response to detecting completion of the moving touch, enter a signature, defined by the path of contact of the touch on the mechanical keys, into the signature entry field at which the touch was detected.

2. The portable electronic device according to claim 1, wherein completion of the moving touch comprises detecting an end of the moving touch.

3. The portable electronic device according to claim 2, wherein detecting the end of the moving touch comprises detecting an end of contact of the touch and determining that a time period after the end of contact of the touch meets a threshold period of time.

4. The portable electronic device according to claim 1, wherein at least a portion of the keycaps are translucent and the keycaps are selectively illuminable through the keycaps.

5. The portable electronic device according to claim 4, comprising a plurality of light emitting diodes disposed under the keycaps for selectively illuminating the keycaps.

6. The portable electronic device according to claim 4, wherein the keycaps are selectively illuminable to show the keys contacted along the path of contact of the touch.

7. The portable electronic device according to claim 1, wherein the keyboard touch sensors comprise a plurality of drive electrodes and a plurality of sense electrodes at the keycaps of the keyboard.

8. A method of controlling an electronic device comprising a touch-sensitive display and a keyboard including a plurality of mechanical keys associated with a plurality of characters, the mechanical keys including depressible keycaps to output respective characters of the plurality of characters and keyboard touch sensors additionally arranged and constructed to detect touches on the mechanical keys, the method comprising:
   detecting a touch on the touch-sensitive display, at a location at which a signature entry field displayed on the touch-sensitive display;
   in response to detecting the touch at the location at which the signature entry field is displayed, entering a keyboard signature process;
   detecting a moving touch on the mechanical keys of the keyboard, along a path of contact of the touch on the mechanical keys of the keyboard when in the keyboard signature process; and
   in response to detecting completion of the moving touch, entering into the signature entry field at which the touch was detected, a signature defined by the path of contact of the touch on the mechanical keys.

9. The method according to claim 8, wherein detecting completion of the moving touch comprises detecting an end of the moving touch.

10. The method according to claim 9, wherein detecting the end of the moving touch comprises detecting an end of contact of the touch and determining that a time period after the end of contact of the touch meets a threshold period of time.

11. The method according to claim 8, comprising selectively illuminating at least portions of keycaps to show the mechanical keys contacted along the path of contact of the touch.

12. A non-transitory computer-readable medium having computer-readable code stored thereon, the computer-readable code executable by at least one processor of a portable electronic device to perform the method according to claim 8.

* * * * *